(12) United States Patent
Chen et al.

(10) Patent No.: US 12,039,947 B2
(45) Date of Patent: Jul. 16, 2024

(54) DISPLAY DEVICE AND DRIVING METHOD THEREOF

(71) Applicants: Beijing BOE Optoelectronics Technology Co., Ltd., Beijing (CN); BOE Technology Group Co., Ltd., Beijing (CN)

(72) Inventors: Yinwei Chen, Beijing (CN); Guixin Yan, Beijing (CN); Jian Sang, Beijing (CN); Tiankuo Shi, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 448 days.

(21) Appl. No.: 17/416,455

(22) PCT Filed: Dec. 29, 2020

(86) PCT No.: PCT/CN2020/140997
§ 371 (c)(1),
(2) Date: Jun. 18, 2021

(87) PCT Pub. No.: WO2021/169580
PCT Pub. Date: Sep. 2, 2021

(65) Prior Publication Data
US 2023/0178043 A1    Jun. 8, 2023

(30) Foreign Application Priority Data

Feb. 25, 2020   (CN) .......................... 202010116714.4

(51) Int. Cl.
*G09G 3/36*   (2006.01)
*G02F 1/13*   (2006.01)
(Continued)

(52) U.S. Cl.
CPC ......... *G09G 3/3607* (2013.01); *G02F 1/1323* (2013.01); *G02F 1/133531* (2021.01);
(Continued)

(58) Field of Classification Search
None
See application file for complete search history.

(56) References Cited

U.S. PATENT DOCUMENTS 4,147,754 A * 4/1979 Ward, III ............. B01D 53/229
  423/232
8,405,572 B1 * 3/2013 Want ................... G02F 1/13471
  349/122

(Continued)

FOREIGN PATENT DOCUMENTS

CN   102479490 A   5/2012
CN   103531164 A   1/2014
(Continued)

OTHER PUBLICATIONS

CN202010116714.4 First Office Action.
CN202010116714.4 Second Office Action.

*Primary Examiner* — Fred Tzeng
(74) *Attorney, Agent, or Firm* — IPro, PLLC (57) ABSTRACT

The present disclosure discloses a display device and a driving method thereof. The driving method includes: when an anti-peep mode is enabled, generating M-frame sub-picture information and M-frame raster picture information according to information of a current picture frame to be displayed; controlling a sub-display panel in the display device to sequentially display M sub-pictures according to the M-frame sub-picture information, controlling pixel rows of the sub-pictures to be periodically arranged and displayed as first pixel groups, and controlling the first pixel groups of the pixel rows corresponding to the sub-pictures to be mutually misaligned; and controlling a sub-raster panel in (Continued)

the display device to sequentially display M raster pictures according to the M-frame raster picture information, and controlling pixel rows of the raster pictures to be periodically arranged and displayed as second pixel groups.

16 Claims, 6 Drawing Sheets

(51) Int. Cl.
  *G02F 1/1335*    (2006.01)
  *G02F 1/13357*    (2006.01)
  *G02F 1/1347*    (2006.01)
  *G09G 3/20*    (2006.01)

(52) U.S. Cl.
  CPC ........ *G02F 1/13362* (2013.01); *G02F 1/1347* (2013.01); *G09G 3/2096* (2013.01); *G02F 1/133504* (2013.01); *G09G 2330/021* (2013.01); *G09G 2358/00* (2013.01)

(56) References Cited

U.S. PATENT DOCUMENTS

| | | | | |
|---|---|---|---|---|
| 10,104,367 | B2* | 10/2018 | Guo | H04N 13/349 |
| 10,262,601 | B1* | 4/2019 | Guntaka | G09G 3/348 |
| 10,540,936 | B1* | 1/2020 | Kumar | G02B 26/005 |
| 2002/0015104 | A1* | 2/2002 | Itoh | H04N 7/01 |
| | | | | 348/E7.003 |
| 2013/0265340 | A1 | 10/2013 | Ahn | |
| 2015/0054860 | A1 | 2/2015 | Lin et al. | |
| 2016/0329033 | A1* | 11/2016 | Woo | G09G 5/393 |
| 2016/0379394 | A1* | 12/2016 | Kim | G02B 30/27 |
| | | | | 345/629 |
| 2017/0176809 | A1* | 6/2017 | Mao | G02F 1/1323 |
| 2017/0230643 | A1* | 8/2017 | Guo | G09G 3/003 |
| 2017/0269283 | A1 | 9/2017 | Wang et al. | |
| 2019/0098267 | A1* | 3/2019 | Poon | H04N 9/3129 |
| 2019/0107719 | A1* | 4/2019 | Edwin | G02B 3/0006 |
| 2019/0393286 | A1* | 12/2019 | Ding | H10K 59/60 |
| 2021/0208431 | A1* | 7/2021 | You | G02F 1/133531 |
| 2021/0407445 | A1* | 12/2021 | Wang | G09G 3/3648 |
| 2022/0036848 | A1* | 2/2022 | Chen | G02F 1/133514 |
| 2022/0107519 | A1* | 4/2022 | Chen | H10K 59/50 |

FOREIGN PATENT DOCUMENTS

| | | |
|---|---|---|
| CN | 105118383 A | 12/2015 |
| CN | 109239996 A | 1/2019 |
| CN | 110264967 A | 9/2019 |
| CN | 110568641 A | 12/2019 |
| CN | 111261121 A | 6/2020 |
| JP | 2006195388 A | 7/2006 |

* cited by examiner

DISPLAY DEVICE AND DRIVING METHOD THEREOF

CROSS-REFERENCES TO RELATED DISCLOSURE

The present disclosure is a National Stage of International Application No. PCT/CN2020/140997, filed on Dec. 29, 2020, which claims the priority to Chinese Patent Application No. 202010116714.4, filed with the China National Intellectual Property Administration on Feb. 25, 2020, the content of which are incorporated herein by reference in their entirety.

FIELD

The present disclosure relates to the field of display technology, in particular to a display device and a driving method thereof.

BACKGROUND

With the development of mobile display devices, the number of display devices in public places has gradually increased, which has brought about increasingly serious privacy leakage problems. Traditional display products have a relatively wide range of viewing angles. In addition to a normal front viewing angle, people from other angles beside a user can also see a screen clearly, so it is difficult to protect the privacy of the user. Although an anti-peep film on the market can achieve a certain level of privacy protection, a screen image observed by the user through the anti-peep film appears very dark because the anti-peep film attenuates brightness of light severely, it is difficult to meet the requirements for reducing power consumption, and wide application of the anti-peep film is limited. Therefore, developers have proposed many anti-peep display solutions to achieve privacy protection. A more common method is to attach an anti-peep sheet to the screen, but the use of the anti-peep sheet has great limitations, resulting in limitation of viewing angles of the display screen, so the requirements of shared display in some scenarios cannot be satisfied.

That is to say, when for anti-peeping in the prior art, anti-peeping on a physical structure is mainly realized by structurally adding the anti-peep film or the anti-peep sheet. However, this kind of improvement will result in lower brightness of a display panel, higher power consumption, and a limited viewing angle range, and functions of anti-peeping and sharing cannot be combined.

SUMMARY

The present disclosure provides a display device and a driving method thereof so as to solve the problems that in the prior art, anti-peeping will result in lower brightness of a display panel, higher power consumption and a limited viewing angle range, and functions of anti-peeping and sharing cannot be combined.

An embodiment of the present disclosure provides a driving method of a display device, including:
generating M-frame sub-picture information and M-frame raster picture information according to information of a current picture frame to be displayed, in a condition that an anti-peep mode is enabled;
controlling a sub-display panel in the display device to sequentially display M sub-pictures according to the M-frame sub-picture information, controlling pixel rows of the sub-pictures to be periodically arranged and displayed as first pixel groups, and controlling the first pixel groups of the pixel rows corresponding to the sub-pictures to be mutually misaligned, so that the M sub-pictures form the current picture frame when continuously displayed, wherein each of the first pixel groups includes at least one display pixel and at least one first light-shielding pixel arranged in sequence; and
controlling a sub-raster panel in the display device to sequentially display M raster pictures according to the M-frame raster picture information, and controlling pixel rows of the raster pictures to be periodically arranged and displayed as second pixel groups, wherein each of the second pixel groups includes: a transparent pixel corresponding to the display pixel in a sub-picture currently displayed and a second light-shielding pixel corresponding to the first light-shielding pixel; and at a same display moment, an orthographic projection of the transparent pixel in the sub-display panel overlaps an area where the display pixel is located, and an orthographic projection of the second light-shielding pixel in the sub-display panel overlaps an area where the first light-shielding pixel is located.

In a possible implementation, the controlling the pixel rows of the sub-pictures to be periodically arranged and displayed as the first pixel groups includes:
controlling first pixel groups of adjacent pixel rows of the sub-pictures to be arranged and displayed in sequence in a misaligned mode.

In a possible implementation, the controlling the first pixel groups of the pixel rows corresponding to the sub-pictures to be mutually misaligned includes:
controlling a first pixel group of a pixel row of a next sub-picture to be misaligned with a first pixel group of a corresponding pixel row of a current sub-picture by positions of m pixels in sequence, wherein m is a number of display pixels in the first pixel group.

In a possible implementation, each transparent pixel includes a plurality of sub raster transparent pixels, and each second light-shielding pixel includes a plurality of sub raster second light-shielding pixels; and in a condition that the pixel rows of the raster pictures are controlled to be periodically arranged and displayed as the second pixel groups, the driving method further includes:
controlling a first sub raster transparent pixel adjacent to the second light-shielding pixel in the transparent pixel to be displayed in a semi-light-shielding state and controlling a first sub raster second light-shielding pixel adjacent to the transparent pixel in the second light-shielding pixel to be displayed in a semi-light-shielding state.

In a possible implementation, the controlling the first sub raster transparent pixel adjacent to the second light-shielding pixel in the transparent pixel to be displayed in the semi-light-shielding state and the controlling the first sub raster second light-shielding pixel adjacent to the transparent pixel in the second light-shielding pixel to be displayed in the semi-light-shielding state include:
controlling the first sub raster transparent pixel adjacent to the second light-shielding pixel in the transparent pixel to be displayed at a grey scale of L128, and controlling the first sub raster second light-shielding pixel adjacent to the transparent pixel in the second light-shielding pixel to be displayed at a grey scale of L128.

In a possible implementation, a number of the display pixels in the first pixel group is equal to 1/M of a total number of pixels in the first pixel group.

In a possible implementation, M is 2.

In a possible implementation, the controlling the pixel rows of the sub-pictures to be periodically arranged and displayed as the first pixel groups includes:

controlling an anti-peep layout cycle to satisfy a formula as follows:

$$\frac{\frac{w}{(1+t)*n}}{\frac{1}{2}*N*\text{pitch}} = \frac{L}{d};$$

and controlling an anti-peep critical angle to satisfy a formula as follows:

$$(L+d)*\tan\alpha = \frac{1}{2}*w,$$

wherein W represents a length of a space cycle of an anti-peep layout unit, t represents an aperture ratio of the sub-raster panel, n represents a refractive index of a substrate in the sub-display panel, N represents a number of pixels in the first pixel group, pitch represents a total number of pixels in the sub-raster panel, L represents a viewing distance, d represents a distance between a liquid crystal layer of the sub-display panel and a liquid crystal layer of the sub-raster panel, and α represents the anti-peep critical angle.

In a possible implementation, the generating the M-frame sub-picture information and the M-frame raster picture information according to the information of the current picture frame to be displayed includes:

performing, by a field programmable gate array, image split and raster generation algorithm processing on the information of the current picture frame output by a System on Chip, to obtain the M-frame sub-picture information and the M-frame raster picture information.

In a possible implementation, in a condition that the M-frame sub-picture information and the M-frame raster picture information are generated according to the information of the current picture frame to be displayed, the driving method further includes:

generating, by a timing sequence controller, driving timing sequence signals and sending, by the timing sequence controller, the driving timing sequence signals to a logic chip of the sub-display panel and a logic chip of the sub-raster panel respectively.

In a possible implementation, the driving method further includes:

controlling all pixels in the sub-display panel to be displayed normally, and controlling all pixels in the sub-raster panel to be transparently displayed, in a condition that a shared display mode is enabled.

An embodiment of the present disclosure further provides a display device, including: a backlight module, the sub-display panel and the sub-raster panel overlapping with each other on a light-out side of the backlight module, as well as a processor, wherein the processor is configured to execute the driving method provided by the embodiment of the present disclosure.

In a possible implementation, the sub-display panel is on a side of the sub-raster panel away from the backlight module;

the display device further includes: a first polarizer between the sub-raster panel and the backlight module, a second polarizer between the sub-raster panel and the sub-display panel, and a third polarizer on a side of the sub-display panel away from the sub-raster panel; and an optical axis of the first polarizer is parallel to an optical axis of the third polarizer and is perpendicular to an optical axis of the second polarizer.

In a possible implementation, the display device further includes: a light diffusing layer between a second polarizer and the sub-raster panel.

In a possible implementation, each pixel in the sub-display panel includes a plurality of sub panel pixels which are arranged in sequence in a first direction, each pixel in the sub-raster panel includes a plurality of sub raster pixels which are arranged in sequence in a second direction, the pixels in the sub-display panel and the pixels in the sub-raster panel are identical in size, and the first direction is perpendicular to the second direction.

The embodiments of the present disclosure have the beneficial effects as follows: according to a driving method of a display device provided by an embodiment of the present disclosure, when anti-peep display is performed, M-frame sub-picture information and M-frame raster picture information are generated according to information of a current picture frame to be displayed, that is, a traditional complete picture is split into M sub-pictures; the display device includes a sub-display panel and a sub-raster panel, the sub-display panel displays the M sub-pictures in sequence and the sub-raster panel displays the M raster pictures in sequence, wherein pixel rows of each of the sub-pictures are periodically arranged and displayed as the first pixel group, each first pixel group includes at least one display pixel and at least one first light-shielding pixel, and some pixels in the sub-display panel perform display and some pixels perform light shielding; the display pixels and the light-shielding pixels are alternately arranged, and the sub-raster panel performs transmission of pixels at display positions in the sub-display panel and performs light shielding on pixels at light-shielding positions in the sub-display panel, so that only a user directly facing the display device may view displayed content and other people viewing at a certain squint angle cannot view the displayed content, thereby achieving anti-peep display; and compared with a method of performing anti-peep display through an anti-peep film or an anti-peep sheet in the prior art, anti-peep display provided by the present disclosure may solve the problems that in the prior art, anti-peeping will result in lower brightness of a display panel, higher power consumption and a limited viewing angle range, and functions of anti-peeping and sharing cannot be combined.

DETAILED DESCRIPTION OF THE EMBODIMENTS

In order to make the objectives, technical solutions, and advantages of the present disclosure clearer, the technical solutions of embodiments of the present disclosure will be clearly and completely described in detail below in conjunction with the accompanying drawings of the embodiments of the present disclosure. Obviously, the described embodiments are only a part of the embodiments of the present disclosure, rather than all of the embodiments. Based on the described embodiments of the present disclosure, all other embodiments obtained by those of ordinary skill in the art without creative work shall fall within the protection scope of the present disclosure.

Unless otherwise defined, the technical terms or scientific terms used in the present disclosure shall have the common meanings understood by those of ordinary skill in the art to which the present disclosure belongs. The terms "first", "second" and similar words used in the present disclosure do not indicate any order, quantity or importance, but are only used to distinguish different components. "Include" or "comprise" and other similar words mean that an element or item appearing before the word covers an element or item listed after the word and their equivalents, but does not exclude other elements or items. Similar words such as "connected" or "linked" are not limited to physical or mechanical connections, but may include electrical connections, whether direct or indirect. "Up", "Down", "Left", "Right", etc. are only used to indicate the relative position relationship. When an absolute position of a described object changes, the relative position relationship may also change accordingly.

In order to keep the following description of the embodiments of the present disclosure clear and concise, the present disclosure omits detailed descriptions of known functions and known components.

Figure 1:
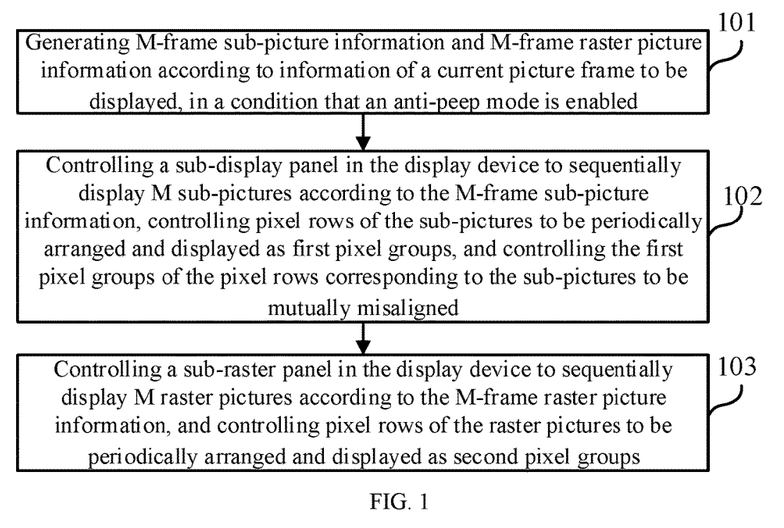
FIG. 1 is a flow chart of a driving method of a display device provided by an embodiment of the present disclosure.

As shown in FIG. 1, an embodiment of the present disclosure provides a driving method of a display device, including the following steps.

Step 101, when an anti-peep mode is enabled, M-frame sub-picture information and M-frame raster picture information are generated according to information of a current picture frame to be displayed. That is, each picture frame to be displayed is provided with corresponding picture information before being displayed, and the sub-picture information and the raster picture information may be generated according to the corresponding picture information, wherein the M-frame sub-picture information is used for subsequent display of a plurality of sub-pictures and the M-frame raster picture information is used for subsequent display of a plurality of raster pictures.

Step 102, a sub-display panel in the display device is controlled to sequentially display M sub-pictures according to the M-frame sub-picture information, pixel rows of the sub-pictures are controlled to be periodically arranged and displayed as first pixel groups, and the first pixel groups of the pixel rows corresponding to the sub-pictures are controlled to be mutually misaligned, so that the M sub-pictures form a current picture frame when continuously displayed, wherein each first pixel group includes at least one display pixel and at least one first light-shielding pixel arranged in sequence. Specifically, the display pixels are used for normal color display, and the first light-shielding pixels may be black pixels. Specifically, the first light-shielding pixels may be formed by controlling a grey scale of the pixels, for example, controlling a grey scale to be L0.

Step 103, a sub-raster panel in the display device is controlled to sequentially display M raster pictures according to the M-frame raster picture information, and pixel rows of the raster pictures are controlled to be periodically arranged and displayed as second pixel groups, wherein each second pixel group includes: a transparent pixel corresponding to a display pixel in a sub-picture currently displayed and a second light-shielding pixel corresponding to one first light-shielding pixel. At a same display moment, an orthographic projection of the transparent pixel in the sub-display panel overlaps an area where the display pixel is located, and an orthographic projection of the second light-shielding pixel in the sub-display panel overlaps an area where the first light-shielding pixel is located. That is, a raster picture displayed by the sub-raster panel needs to correspond to the sub-picture currently displayed by the sub-display panel, transparent display is performed at a position where the sub-display panel normally displays, and light shielding display is performed at a position where the sub-display panel performs light shielding. Similarly, the second light-shielding pixels may be black pixels. Specifically, the second light-shielding pixels may be formed by controlling a grey scale to be L0, and for transparent display, the transparent pixels may be formed by controlling a grey scale to be L255.

According to the driving method of the display device provided by the embodiment of the present disclosure, when anti-peep display is performed, the M-frame picture information and the M-frame raster picture information are generated according to the information of every current picture frame to be displayed. That is, a traditional complete picture is split into the M sub-pictures and the corresponding M raster pictures are generated at the same time. The display device includes the sub-display panel and the sub-raster panel, the sub-display panel displays the M sub-pictures in sequence, and the sub-raster panel displays the M raster pictures in sequence, wherein the pixel rows of each sub-picture are periodically arranged and displayed as the first pixel group and each first pixel group includes at least one display pixel and at least one light-shielding pixel, i.e. some pixels in the sub-display panel perform display and some pixels perform light shielding. The display pixels and the light-shielding pixels are alternately arranged, and the sub-raster panel performs transmission of pixels at display positions in the sub-display panel and performs light shielding on pixels at light-shielding positions in the sub-display panel, so that only a user directly facing the display device may view displayed content and other people viewing at a certain squint angle cannot view the displayed content, therefore achieving anti-peep display. Compared with a method of performing anti-peep display through an anti-peep film or an anti-peep sheet in the prior art, anti-peep display provided by the present disclosure may solve the problems that, in the prior art, anti-peeping will result in lower brightness of a display panel, higher power consumption and a limited viewing angle range, and functions of anti-peeping and sharing cannot be combined.

It should be noted that, for the sub-display panel, each pixel may include a plurality of sub panel pixels, for example, specifically including three sub panel pixels. Since the pixels in the sub-display panel are divided into display pixels and first light-shielding pixels, further, each of the display pixels may include a plurality (for example, three) of sub panel display pixels, and each of the first light-shielding pixels may include a plurality (for example, three) of sub panel first light-shielding pixels. Similarly, for the sub-raster panel, each pixel may include a plurality of sub raster pixels, for example, specifically including three sub raster pixels. Since the pixels in the sub-raster panel are divided into transparent pixels and second light-shielding pixels, further, each of the transparent pixels may include a plurality (for example, three) of sub raster transparent pixels, and each of the second light-shielding pixels may include a plurality (for example, three) of sub raster second light-shielding pixels.

In specific implementation, the driving method further includes: Step 104, when it is determined that a shared display mode is enabled, all pixels in the sub-display panel are controlled to be displayed normally, and all pixels in the sub-raster panel are controlled to be transparently displayed.

In order to more clearly understand a driving principle of the display device provided by the embodiment of the present disclosure, detailed descriptions will be made below through specific examples.

For instance, take M being 2 as an example.

Figure 2:
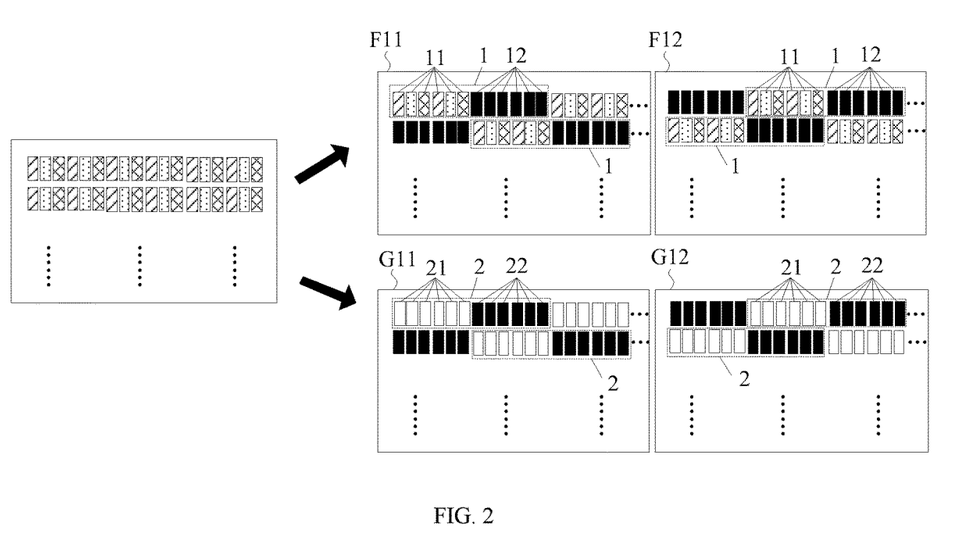
FIG. 2 is a schematic diagram of a display principle when M is 2 provided by an embodiment of the present disclosure.

For a picture to be displayed by the sub-display panel, as shown in FIG. 2, the left side in FIG. 2 is a complete current picture frame to be displayed, which is split into two sub-pictures on the right side in FIG. 2, namely a first sub-picture F11 and a second sub-picture F12. Specifically, each of pixel rows of the first sub-picture F11 includes a plurality of first pixel groups 1 which are periodically arranged, and each of the first pixel groups 1 may include 6 sub panel display pixels 11 (i.e. two display pixels) and 6 sub panel first light-shielding pixels 12 (i.e. two first light-shielding pixels); and each of pixel rows of the second sub-picture F12 includes a plurality of first pixel groups 1 which are periodically arranged, and the first pixel groups 1 of the pixel rows of the first sub-picture F11 and the first pixel groups 1 of corresponding pixel rows of the second sub-picture F12 are mutually misaligned. For example, the first pixel group 1 of a first row of pixels of the first sub-picture F11 and the first pixel group 1 of a first row of pixels of the second sub-picture F12 are misaligned by 6 sub panel display pixels, i.e. the first pixel groups 1 of the first sub-picture F11 are arranged from the first sub panel display pixel in the left while the first pixel groups 1 are arranged in a first pixel row of the second sub-picture F12 at the interval of 6 sub panel first light-shielding pixels. In this way, when continuously displayed, the first sub-picture F11 and the second sub-picture F12 form the complete current picture frame on the left side in FIG. 2. Of course, in the embodiment, each of the first pixel groups 1 may include other quantity of sub panel display pixels and sub panel first light-shielding pixels, for example, each of the first pixel groups 1 may include 9 sub panel display pixels and 9 sub panel first light-shielding pixels.

Figure 3:
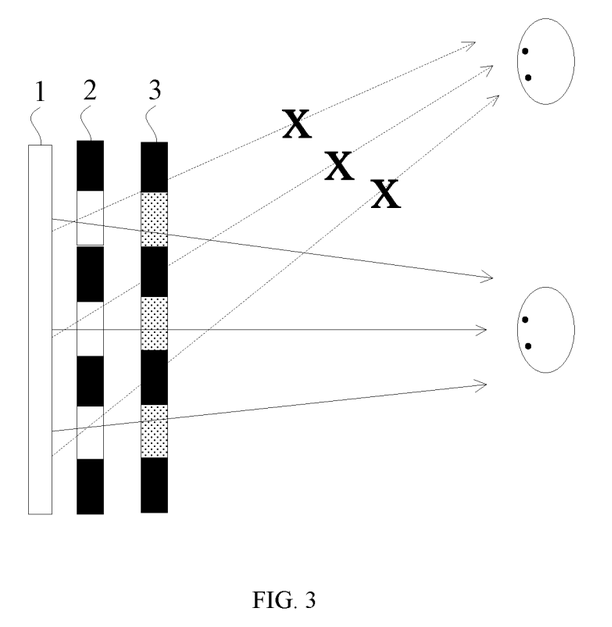
FIG. 3 is a schematic diagram of an anti-peep effect provided by an embodiment of the present disclosure.

As shown in the lower part of FIG. 2, a picture to be displayed by the sub-raster panel includes a first raster picture G11 and a second raster picture G12, wherein each of pixel rows of the first raster picture G11 includes a plurality of second pixel groups 2 which are periodically arranged, and each of the plurality of second pixel groups 2 may include 6 sub raster transparent pixels 21 (i.e. two transparent pixels) corresponding to the 6 sub panel display pixels 11 in the first sub-display picture F11 and 6 sub raster second light-shielding pixels 22 (i.e. two light-shielding pixels) corresponding to the 6 sub panel first light-shielding pixels 12 of the second sub-display picture F12. Similarly, each of pixel rows of the second raster picture G12 includes a plurality of second pixel groups 2 which are periodically arranged, and each of the plurality of second pixel groups 2 may include 6 sub raster transparent pixels 21 corresponding to the 6 sub panel display pixels 11 in the second sub-display picture F12 and 6 sub raster second light-shielding pixels 22 corresponding to the 6 sub panel first light-shielding pixels 12 in the second sub-display picture F12. That is, the picture displayed by the sub-raster panel needs to correspond to the sub-picture currently displayed by the sub-display panel, i.e. light-transmitting display is performed at positions of pixels in the sub-raster panel corresponding to display pixels of a current sub-display panel and light shielding is performed at positions of pixels in the sub-raster panel corresponding to light-shielding pixels of the current sub-display panel. In this way, when users are viewing, as shown in FIG. 3, the display device includes a backlight module 1, the sub-raster panel 2 and the sub-display panel 3. The user directly facing the display device may view the displayed content and other users viewing at a certain squint angle cannot view the displayed content because positions of light emitting will be blocked by the light-shielding pixels, so anti-peep display is realized.

Figure 4:
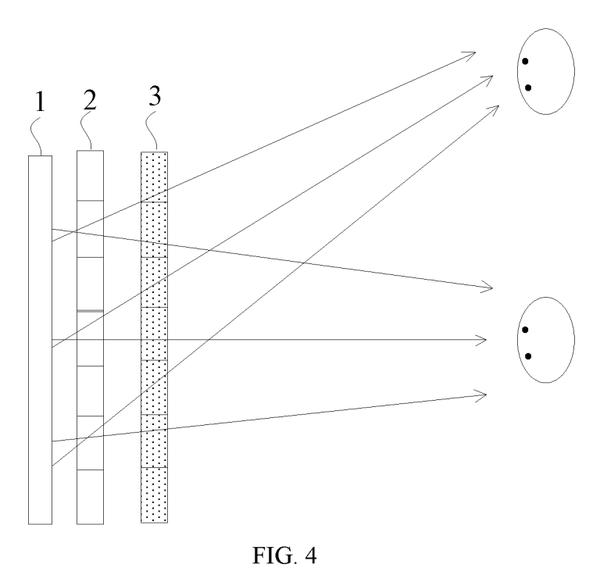
FIG. 4 is a schematic diagram of a sharing effect provided by an embodiment of the present disclosure.

When shared display is needed, all pixels in the sub-display panel may be enabled to be normally displayed and all pixels in the sub-raster panel are controlled to be transparently displayed, so, as shown in FIG. 4, the user directly facing the display device and the people viewing at a certain squint angle may view the displayed content.

Figure 5:
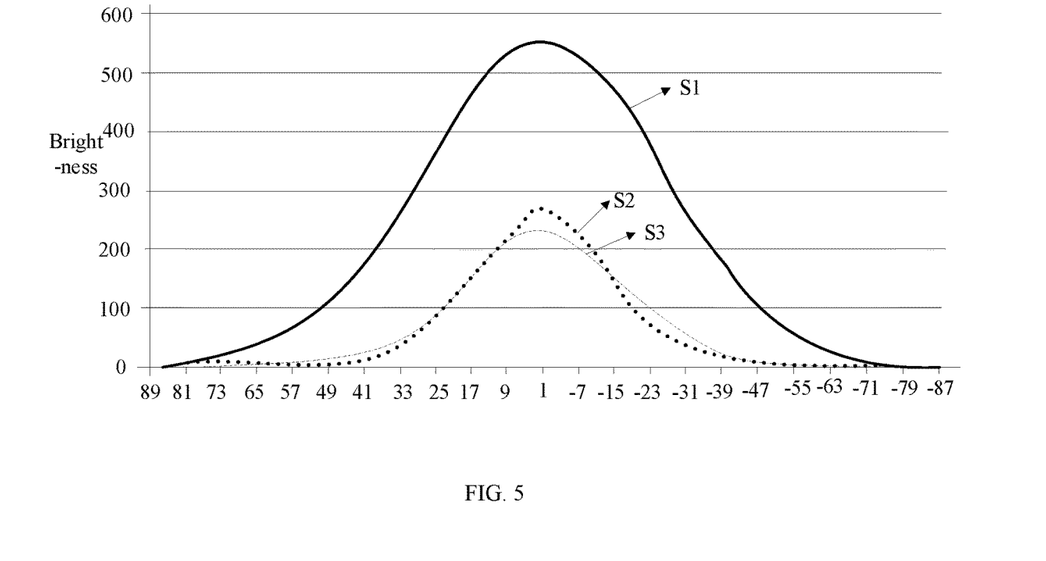
FIG. 5 is a schematic diagram of a relationship between viewing angles and brightness in different display modes.

FIG. 5 shows an optical simulation result of distribution of brightness with changes of viewing angles in an anti-peep state. In FIG. 5, S1 is the distribution of the brightness and the viewing angles in a sharing state. It can be seen that screen brightness is relatively high in this state, and there is no obvious brightness loss. With reference to brightness requirements of a conventional anti-peep screen, according to the sensitivity of human vision, it is usually required that the screen brightness be lower than 10 nit or 2% of forward screen brightness under an anti-peep viewing angle. The anti-peeping effect in the prior art is shown by curve S2 in FIG. 5, the brightness is relatively high at a viewing angle of 50°, and at a large angle (such as about 73°), the screen brightness is increased and the anti-peeping effect is poor. According to the anti-peeping technical solution adopted in the present disclosure, as shown by curve S3 in FIG. 5, light transmittance of the sub-raster panel during anti-peep display is improved by controlling grey scale brightness of the sub-raster panel, that is, brightness of the display screen is improved. At the same time, the screen brightness may be reduced in a larger anti-peep viewing angle range (>50° to achieve anti-peeping).

For another example, take M being 3 as an example.

Figure 6:
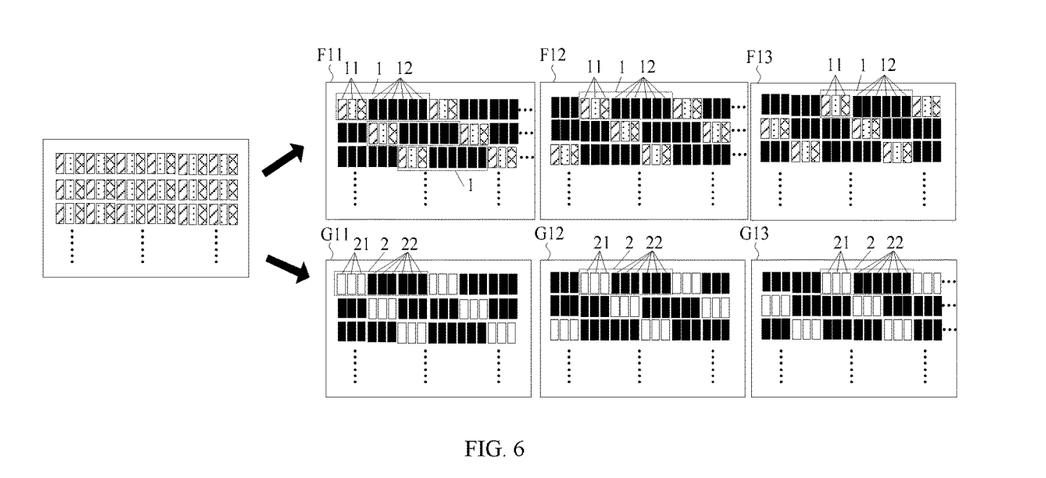
FIG. 6 is a schematic diagram of a display principle when M is 3 provided by an embodiment of the present disclosure.

For a picture to be displayed by the sub-display panel, as shown in FIG. 6, the left side in FIG. 6 is a complete current picture frame to be displayed, which is split into three sub-pictures on the right side, namely a first sub-picture F11, a second sub-picture F12 and a third sub-picture F13. Specifically, each of pixel rows of the first sub-picture F11 includes a plurality of first pixel groups 1 which are periodically arranged, and each of the first pixel groups 1 may include 3 sub panel display pixels 11 (i.e. one display pixel) and 6 sub panel first light-shielding pixels 12 (i.e. two first light-shielding pixels); each of pixel rows of the second sub-picture F12 also includes a plurality of first pixel groups 1 which are periodically arranged, and the first pixel groups 1 of the pixel rows of the second sub-picture F12 and the first pixel groups 1 corresponding pixel rows of the first sub-picture F11 are mutually misaligned; and each of pixel rows of the third sub-picture F13 also includes a plurality of first pixel groups 1 which are periodically arranged, and the first pixel groups 1 of the pixel rows of the third sub-picture F13 and the first pixel groups 1 corresponding pixel rows of the second sub-picture F12 are mutually misaligned. For example, the first pixel group 1 of a first row of pixels of the second sub-picture F12 are misaligned with the first pixel group 1 of a first row of pixels of the first sub-picture F11 by 3 sub panel display pixels, and the first pixel group 1 of a first row of pixels of the third sub-picture F13 are misaligned with the first pixel group 1 of the first row of pixels of the second sub-picture F12 by 3 sub panel display pixels, i.e. the first pixel groups 1 of the first sub-picture F11 are arranged from the first sub panel display pixel in the left, the first pixel groups 1 are arranged in a first pixel row of the second sub-picture F12 at the interval of 3 sub panel first light-shielding pixels, and the first pixel groups 1 are arranged in a first pixel row of the third sub-picture F13 at the interval of 6 sub panel first light-shielding pixels. In this way, when continuously displayed, the first sub-picture F11, the second sub-picture F12 and the third sub-picture F13 form the complete current picture frame on the left side in FIG. 6. Of course, in the embodiment, each of the first pixel groups 1 may include other quantity of sub panel display pixels 11 and sub panel first light-shielding pixels 12.

As shown in the lower part of the right side in FIG. 6, the picture to be displayed by the sub-raster panel includes a first raster picture G11, a second raster picture G12, and a third raster picture G13, wherein each of pixel rows of the first raster picture G11 includes a plurality of second pixel groups 2 which are periodically arranged, and each of the plurality of second pixel groups 2 may include 3 sub raster transparent pixels 21 (i.e. one transparent pixel) corresponding to the 3 sub panel display pixels 11 (i.e. one display pixel) in the first sub-display picture F11 and 3 sub raster second light-shielding pixels 22 corresponding to the 3 sub panel first light-shielding pixels 12 of the first sub-display picture F11. Similarly, each of pixel rows of the second raster picture G12 includes a plurality of second pixel groups 2 which are periodically arranged, and each of the plurality of second pixel groups 2 of the second raster picture G12 may include 3 sub raster transparent pixels 21 corresponding to the 3 sub panel display pixels 11 in the second sub-display picture F12 and 3 sub raster second light-shielding pixels 22 corresponding to the 3 sub panel first light-shielding pixels 12 in the second sub-display picture F12. Similarly, each of pixel rows of the third raster picture G13 includes a plurality of second pixel groups 2 which are periodically arranged, and each of the plurality of second pixel groups 2 of the third raster picture G13 may include 3 sub raster transparent pixels 21 corresponding to the 3 sub panel display pixels 11 at corresponding positions of pixels in the third sub-display picture F13 and 3 sub raster second light-shielding pixels 22 corresponding to the 3 sub panel first light-shielding pixels 12 in the third sub-display picture F13. In this way, when users are viewing, in combination with FIG. 3, the user directly facing the display device may view the displayed content and other users viewing at a certain squint angle cannot view the displayed content because positions at which the light emits will be blocked by the light-shielding pixels, so anti-peep display is realized.

In specific implementation, in step 102, the controlling the pixel rows of the sub-pictures to be periodically arranged and displayed as the first pixel groups includes: first pixel groups of adjacent pixel rows of the sub-pictures are controlled to be arranged and displayed in sequence in a misaligned mode. Specifically, the number of pixels of a first pixel group of a next pixel row misaligned with a first pixel group of a current pixel row may be the number of display pixels in the first pixel group, i.e. as shown in FIG. 2 or FIG. 6, in a same sub-picture, positions of first pixel groups of different pixel rows are mutually misaligned. For example, as shown in FIG. 2, the first pixel groups 1 of the first row of pixels are arranged from a position of the first pixel on the left while the first pixel groups of the second row of pixels are arranged from a position of the seventh pixel on the left, and the first pixel groups of the second row of pixels are misaligned with the first pixel groups of the first row of pixels by positions of 6 sub panel display pixels. It may be understood that, when first pixel groups 1 of different pixel rows of a same sub-picture in the sub-display panel are arranged in a misaligned mode, second pixel groups of different pixel rows of a same raster picture of the sub-raster panel are arranged in a misaligned mode correspondingly. In the embodiment of the present disclosure, by controlling the first pixel groups of adjacent pixel rows of the sub-pictures to be arranged and displayed in sequence in a misaligned mode, the problem that in a same sub-picture, when arrangements of the first pixel groups of different pixel rows are completely identical, black lines will appear on a display panel and display quality is affected may be avoided.

In specific implementation, the controlling the first pixel groups of the pixel rows corresponding the sub-pictures to be mutually misaligned includes: a first pixel group of a pixel row of a next sub-picture are controlled to be misaligned with a first pixel group of a corresponding pixel row of a next sub-picture by positions of m pixels in sequence, wherein m is the number of the display pixels in the first pixel group. That is, for example, as shown in FIG. 2, when the first pixel group includes 2 display pixels and 2 first light-shielding pixels, the first pixel group 1 of the first row of pixels in the second sub-picture F12 and the first pixel group of the first row of pixels of the first sub-picture F11 is misaligned by 2 display pixels. In the embodiment of the present disclosure, by controlling the first pixel group of the pixel row of the next sub-picture to be misaligned with the first pixel group of the corresponding pixel row of the current sub-picture by positions of m pixels, when continuously displayed, a plurality of sub-pictures exactly form a complete current picture frame which has relatively good display quality.

Figure 7:
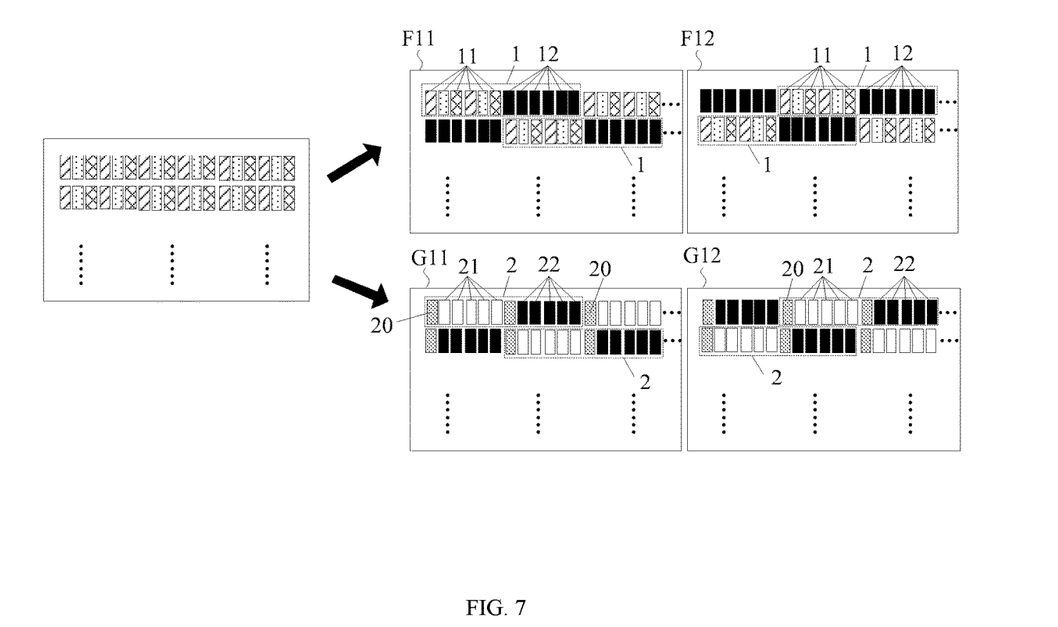
FIG. 7 is a schematic diagram of a display principle when a sub-raster panel has a semi-light-shielding state provided by an embodiment of the present disclosure.

In specific implementation, as shown in FIG. 7, when pixel rows of the raster picture are controlled to be periodically arranged as second pixel groups 2, the driving method further includes: the first sub raster transparent pixel, adjacent to a second light-shielding pixel, in the transparent pixels is controlled to be displayed in a semi-light-shielding state, and the first sub raster second light-shielding pixel, adjacent to a transparent pixel, in the second light-shielding pixels is controlled to be displayed in a semi-light-shielding state. The first may be specifically understood as the first in the left-right direction of the pixel rows. Specifically, display in the semi-light-shielding state may be achieved by controlling the first sub raster transparent pixel adjacent to the second light-shielding pixel in the transparent pixels to be displayed at a grey scale of L128 and controlling the first sub raster second light-shielding pixel adjacent to the transparent pixel in the second light-shielding pixels to be displayed at a grey scale of L128. In the embodiment of the present disclosure, the first sub raster transparent pixel adjacent to the second light-shielding pixel in the transparent pixels is controlled to be displayed in a semi-light-shielding state, and the first sub raster second light-shielding pixel adjacent to the transparent pixel in the second light-shielding pixels is controlled to be displayed in a semi-light-shielding state. That is, a sub-transition pixel 20 is arranged between continuous light-transmitting pixels 21 and continuous light-shielding pixels 22, so the problem that in the process of continuously displaying a plurality of raster pictures, when the light-transmitting pixels 21 are directly switched to the light-shielding pixels 22, a flicker of pictures exists on the display device may be avoided; and the arrangement of the pixels in the semi-light-shielding state may increase anti-peep angles and further improve the anti-peeping effect.

In specific implementation, the number of the display pixels 11 contained by the first pixel groups 1 is equal to 1/M of the total number of pixels in the first pixel groups 1. That is, if a complete current picture frame is split into three sub-display pictures, the number of the display pixels contained by the first pixel groups 1 is equal to ⅓ of the total number of pixels in the first pixel groups 1, i.e. the display pixels in the first pixel group 1 in each of the sub-pictures account for ⅓ of the total number, so when the three sub-pictures are misaligned and continuously displayed, the three sub-pictures may form a complete current display picture.

In specific implementation, M may be 2. In the embodiment of the present disclosure, when M is 2, each complete current picture frame is split into 2 sub-pictures for displayed, and the problem that when the current picture frame is split into an excessively large number of sub-pictures, the number of first light-shielding pixels in each of the first groups is excessively large, i.e. a proportion of black pixels is excessively large, and brightness of the display device is reduced may be avoided.

In specific implementation, the controlling the pixel rows of the sub-pictures to be periodically arranged and displayed as the first pixel groups includes the following.

Calculation of a layout cycle satisfies a formula as follows:

$$\frac{\frac{w}{(1+t)*n}}{\frac{1}{2}*N*\text{pitch}} = \frac{L}{d}$$

wherein W represents a length of a space cycle of an anti-peep layout unit, which may specifically be a length of a range of the light-transmitting pixels, i.e., the transparent pixels, in the sub-raster panel, and to take arrangement in FIG. 2 as an example, a length of 2 light-transmitting pixels in a row direction is ½ of a length of the first pixel group; t represents an aperture ratio of the sub-raster panel (aperture ratio may specifically be obtained through a ratio of the light-transmitting pixel to the total pixels); n represents a refractive index of a substrate in the sub-display panel (when the substrate is glass, it may specifically refer to the refractive index of glass); N represents the number of sub-pixels in a raster cycle, i.e. the number of sub pixels in the first pixel groups; pitch represents the total number of pixels in the sub-raster panel; L represents a viewing distance; and d represents a distance between a liquid crystal layer of the sub-display panel and a liquid crystal layer of the sub-raster panel. That is, a pattern on the display panel may be adjusted by controlling the aperture rate of the sub-raster panel, the number of the sub pixels in the first pixel groups and other factors so as to achieve a desired anti-peep angle.

Further, an anti-peep critical angle α is controlled to satisfy a formula as follows:

$$(L+d)*\tan\alpha = \frac{1}{2}*w$$

wherein L represents the viewing distance, a represents the anti-peep critical angle, and d represents the distance between the liquid crystal layer of the sub-display panel and the liquid crystal layer of the sub-raster panel.

Figure 8:
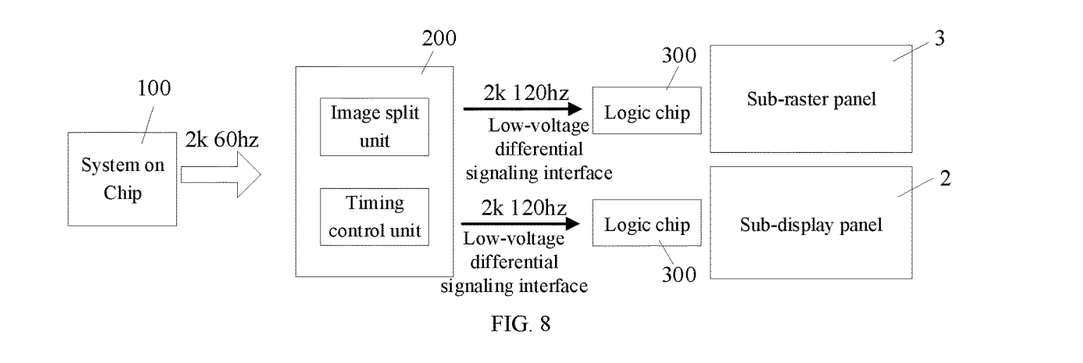
FIG. 8 is a schematic diagram of a driving process of a display device provided by an embodiment of the present disclosure.

In specific implementation, as shown in FIG. 8, in step 101, the generating the M-frame sub-picture information and the M-frame raster picture information according to the information of the current picture frame to be displayed includes: an image split unit and a timing control unit in a field programmable gate array 200 (FPGA) perform image split and raster generation algorithm processing on the information of the current picture frame output by a System on Chip 100 (SOC) to obtain the M-frame sub-picture information and the M-frame raster picture information.

In specific implementation, as shown in FIG. 8, in step 101, when the M-frame sub-picture information and the M-frame raster picture information are generated according to the information of the current picture frame to be displayed, the driving method further includes: a timing sequence controller generates a driving timing sequence signal and sends the same to a logic chip 300 (TCON) of the sub-display panel and a logic chip 300 (TCON) of the sub-raster panel respectively. In the embodiment of the present disclosure, the timing sequence controller gives driving timing sequences of continuous adjacent sub-picture frame signals, and sends each of the frame signals to the TCONs of the sub-display panel and the sub-raster panel respectively to complete conversion and generation of a dual-layer panel signal.

Figure 9:
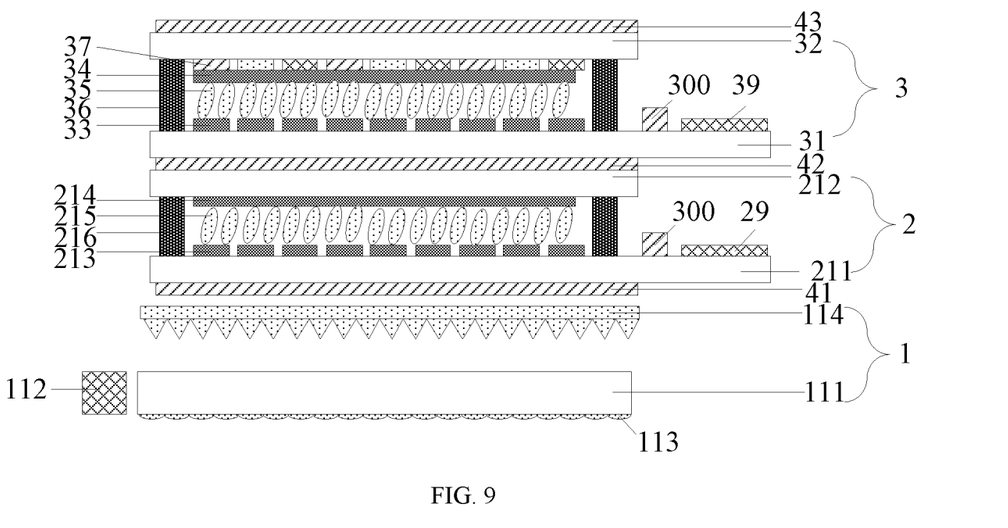
FIG. 9 is a schematic structural diagram of a display device provided by an embodiment of the present disclosure.

An embodiment of the present disclosure further provides a display device. As shown in FIG. 9, the display device includes a backlight module 1, a sub-display panel 3 and a sub-raster panel 2 overlapping on a light-out side of the backlight module 1, as well as a processor (not showed in FIG. 9), wherein the processor is configured to execute the driving method provided by the embodiment of the present disclosure.

In specific implementation, as shown in FIG. 9, the sub-display panel 3 is on a side of the sub-raster panel 2 away from the backlight module 1; the display device further includes: a first polarizer 41 between the sub-raster panel 2 and the backlight module 1, a second polarizer 42 between the sub-raster panel 2 and the sub-display panel 3, and a third polarizer 43 on a side of the sub-display panel 3 away from the sub-raster panel 2; and an optical axis of the first polarizer 41 is parallel to an optical axis of the third polarizer 43 and is perpendicular to an optical axis of the second polarizer 42. In the embodiment of the present disclosure, the sub-display panel 3 is on a side of the sub-raster panel 2 away from the backlight module 1, i.e. the sub-display panel 3 is on a side closer to a user. Under a condition of fixed brightness of the backlight module 1, because a blocking effect of the sub-raster panel 2 does not exist, the display device has a high brightness. Of course, if the problem of brightness is not considered, the sub-raster panel 2 may be on an outermost side.

In specific implementation, as shown in FIG. 9, the backlight module 1 may include a light guide plate 111, diffused particles 113 on a side of the light guide plate 111 away from the sub-raster panel 2, a prismatic lens 114 on a side of the light guide plate 111 facing the sub-raster panel 2, and a light source 112 on an end of the light guide plate 111. The sub-raster panel 2 may specifically be a liquid crystal cell without a color film layer and may specifically include a first substrate 211 and a second substrate 212 which are oppositely arranged as well as a first liquid crystal layer 215 between the two substrates, wherein a first common electrode 214 is further arranged on a side of the second substrate 212 facing the first substrate 211, a first pixel electrode 213 is further arranged on a side of the first substrate 211 facing the second substrate 212, a first frame sealant 216 is further arranged at a position of an edge frame of the first substrate 211 and the second substrate 212, and a logic chip 300 (TCON) and a first signal lead 29 connected with an external circuit may be further arranged in a non-display area on a surface of the first substrate 211 facing the second substrate 212. The sub-display panel 3 may specifically include: a third substrate 31 and a fourth substrate 21 which are oppositely arranged as well as a second liquid crystal layer 35 between the two substrates, wherein a second common electrode 34 is further arranged on a side of the fourth substrate 32 facing the third substrate 31, a second pixel electrode 33 is further arranged on a side of the third substrate 31 facing the fourth substrate 32, a second frame sealant 36 is further arranged at a position of an edge frame of the third substrate 31 and the fourth substrate 32, and a logic chip 300 (TCON) and a second signal lead 29 connected with an external circuit may be further arranged in a non-display area on a surface of the third substrate 31 facing the fourth substrate 32.

Figure 10:
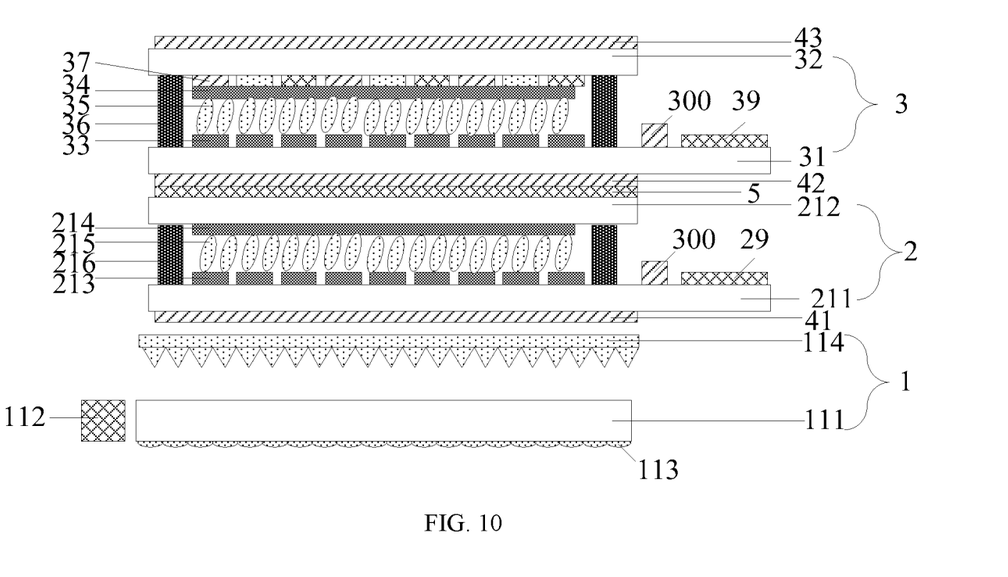
FIG. 10 is a schematic structural diagram of a specific display device provided by an embodiment of the present disclosure.

In specific implementation, as shown in FIG. 10, the display device further includes: a light diffusing layer 5 between a second polarizer 42 and the sub-raster panel 2. In the embodiment of the present disclosure, the display device further includes: the light diffusing layer 5 between the second polarizer 42 and the sub-raster panel 2, wherein the light diffusing layer 5 may realize a certain scattering effect in an emitting direction of light and may reduce the risk of more profiling problems on a screen. The light diffusing layer may be made of a bundled optical transmission material through bundling in a special process.

Figure 11:
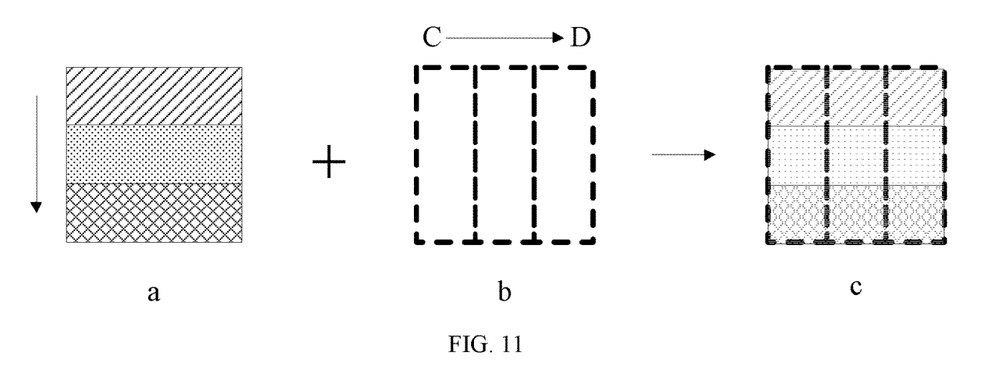
FIG. 11 is a schematic diagram of a relationship of relative positions of a sub-display panel and a sub-raster panel provided by an embodiment of the present disclosure.

In specific implementation, each pixel in the sub-display panel includes a plurality of sub panel pixels which are arranged in sequence in a first direction, each pixel in the sub-raster panel includes a plurality of sub raster pixels which are arranged in sequence in a second direction, the pixels in the sub-display panel and the pixels in the sub-raster panel are identical in size, and the first direction is perpendicular to the second direction. As shown in FIG. 11, a in FIG. 11 represents a pixel in the sub-display panel and includes three sub panel pixels which are arranged in sequence in a first direction AB, and b represents a pixel in the sub-raster panel and includes three sub raster pixels which are arranged in sequence in a second direction CD. The pixel in the sub-display panel and the pixel in the sub-raster panel are perpendicular in arrangement ways.

When anti-peep display is performed, viewing from different angles, because RGB pixels in each upper-layer sub-display panel correspond to single sub-pixels in the sub-raster panel, only brightness differences exist on a picture when the screen is viewed from different angles in this configuration, and the color deviation of the picture caused by that the single sub-pixels corresponds to the single RGB sub-pixels in the sub-raster panel is avoided.

The embodiments of the present disclosure have the beneficial effects as follows: according to a driving method of a display device provided by an embodiment of the present disclosure, when anti-peep display is performed, M-frame sub-picture information and M-frame raster picture information are generated according to information of a current picture frame to be displayed, that is, the traditional complete picture is split into M sub-pictures; the display device includes a sub-display panel and a sub-raster panel, the sub-display panel displays the M sub-pictures in sequence and the sub-raster panel displays the M raster pictures in sequence, wherein pixel rows of each of the sub-pictures are periodically arranged and displayed as the first pixel group, each first pixel group includes at least one display pixel and at least one first light-shielding pixel, some pixels in the sub-display panel perform display and some pixels perform light shielding; the display pixels and the light-shielding pixels are alternately arranged, and the sub-raster panel performs transmission of pixels at display positions in the sub-display panel and performs light shielding on pixels at light-shielding positions in the sub-display panel, so that only a user directly facing the display device may view displayed content and other people viewing at a certain squint angle cannot view the displayed content, therefore achieving anti-peep display; and compared with a method of performing anti-peep display through an anti-peep film or an anti-peep sheet in the prior art, anti-peep display provided by the present disclosure may solve the problems that, in the prior art, anti-peeping will result in lower brightness of a display panel, higher power consumption and a limited viewing angle range, and functions of anti-peeping and sharing cannot be combined.

Apparently, those of skill in the art may make various changes and modifications to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

What is claimed is:

1. A driving method of a display device, comprising:
generating M-frame sub-picture information and M-frame raster picture information according to information of a current picture frame to be displayed, in a condition that an anti-peep mode is enabled;
controlling a sub-display panel in the display device to sequentially display M sub-pictures according to the M-frame sub-picture information, controlling pixel rows of the sub-pictures to be periodically arranged and displayed as first pixel groups, and controlling the first pixel groups of the pixel rows corresponding to the sub-pictures to be mutually misaligned, so that the M sub-pictures form the current picture frame when continuously displayed, wherein each of the first pixel groups comprises at least one display pixel and at least one first light-shielding pixel arranged in sequence; and
controlling a sub-raster panel in the display device to sequentially display M raster pictures according to the M-frame raster picture information, and controlling pixel rows of the raster pictures to be periodically arranged and displayed as second pixel groups, wherein each of the second pixel groups comprises: a transparent pixel corresponding to the display pixel in a sub-picture currently displayed and a second light-shielding pixel corresponding to the first light-shielding pixel; and at a same display moment, an orthographic projection of the transparent pixel in the sub-display panel overlaps an area where the display pixel is located, and an orthographic projection of the second light-shielding pixel in the sub-display panel overlaps an area where the first light-shielding pixel is located.

2. The driving method according to claim 1, wherein the controlling the pixel rows of the sub-pictures to be periodically arranged and displayed as the first pixel groups comprises:
controlling first pixel groups of adjacent pixel rows of the sub-pictures to be arranged and displayed in sequence in a misaligned mode.

3. The driving method according to claim 2, wherein the controlling the first pixel groups of the pixel rows corresponding to the sub-pictures to be mutually misaligned comprises:
controlling a first pixel group of a pixel row of a next sub-picture to be misaligned with a first pixel group of a corresponding pixel row of a current sub-picture by positions of m pixels in sequence, wherein m is a number of display pixels in the first pixel group.

4. The driving method according to claim 1, wherein the controlling the first pixel groups of the pixel rows corresponding to the sub-pictures to be mutually misaligned comprises:
controlling a first pixel group of a pixel row of a next sub-picture to be misaligned with a first pixel group of a corresponding pixel row of a current sub-picture by positions of m pixels in sequence, wherein m is a number of display pixels in the first pixel group.

5. The driving method according to claim 4, wherein each transparent pixel comprises a plurality of sub raster transparent pixels, and each second light-shielding pixel comprises a plurality of sub raster second light-shielding pixels; and in a condition that the pixel rows of the raster pictures are controlled to be periodically arranged and displayed as the second pixel groups, the driving method further comprises:
controlling a first sub raster transparent pixel adjacent to the second light-shielding pixel in the transparent pixel to be displayed in a semi-light-shielding state and controlling a first sub raster second light-shielding pixel adjacent to the transparent pixel in the second light-shielding pixel to be displayed in a semi-light-shielding state.

6. The driving method according to claim 5, wherein the controlling the first sub raster transparent pixel adjacent to the second light-shielding pixel in the transparent pixel to be displayed in the semi-light-shielding state and controlling the first sub raster second light-shielding pixel adjacent to the transparent pixel in the second light-shielding pixel to be displayed in the semi-light-shielding state comprise:
controlling the first sub raster transparent pixel adjacent to the second light-shielding pixel in the transparent pixel to be displayed at a grey scale of L128, and controlling the first sub raster second light-shielding pixel adjacent to the transparent pixel in the second light-shielding pixel to be displayed at a grey scale of L128.

7. The driving method according to claim 4, wherein a number of the display pixels in the first pixel group is equal to 1/M of a total number of pixels in the first pixel group.

8. The driving method according to claim 1, wherein M is 2.

9. The driving method according to claim 1, wherein the controlling the pixel rows of the sub-pictures to be periodically arranged and displayed as the first pixel groups comprises:
controlling an anti-peep layout cycle to satisfy a formula as follows:

$$\frac{\frac{w}{(1+t)*n}}{\frac{1}{2}*N*\text{pitch}} = \frac{L}{d};$$

and controlling an anti-peep critical angle to satisfy a formula as follows:

$$(L+d)*\tan\alpha = \frac{1}{2}*w,$$

wherein W represents a length of a space cycle of an anti-peep layout unit, t represents an aperture ratio of the sub-raster panel, n represents a refractive index of a substrate in the sub-display panel, N represents a number of pixels in the first pixel group, pitch represents a total number of pixels in the sub-raster panel, L represents a viewing distance, d represents a distance between a liquid crystal layer of the sub-display panel and a liquid crystal layer of the sub-raster panel, and α represents the anti-peep critical angle.

10. The driving method according to claim 1, wherein the generating the M-frame sub-picture information and the M-frame raster picture information according to the information of the current picture frame to be displayed comprises:
performing, by a field programmable gate array, image split and raster generation algorithm processing on the information of the current picture frame output by a System on Chip, to obtain the M-frame sub-picture information and the M-frame raster picture information.

11. The driving method according to claim 10, wherein in a condition that the M-frame sub-picture information and the M-frame raster picture information are generated according to the information of the current picture frame to be displayed, the driving method further comprises:
generating, by a timing sequence controller, driving timing sequence signals and sending, by the timing sequence controller, the driving timing sequence signals to a logic chip of the sub-display panel and a logic chip of the sub-raster panel respectively.

12. The driving method according to claim 1, wherein the driving method further comprises:
controlling all pixels in the sub-display panel to be displayed normally, and controlling all pixels in the sub-raster panel to be transparently displayed, in a condition that a shared display mode is enabled.

13. A display device, comprising: a backlight module, the sub-display panel and the sub-raster panel overlapping with each other on a light-out side of the backlight module, as well as a processor, wherein the processor is configured to execute the driving method according to claim 1.

14. The display device according to claim 13, wherein the sub-display panel is on a side of the sub-raster panel away from the backlight module;
- the display device further comprises: a first polarizer between the sub-raster panel and the backlight module, a second polarizer between the sub-raster panel and the sub-display panel, and a third polarizer on a side of the sub-display panel away from the sub-raster panel; and
- an optical axis of the first polarizer is parallel to an optical axis of the third polarizer and is perpendicular to an optical axis of the second polarizer.

15. The display device according to claim 14, further comprising: a light diffusing layer between the second polarizer and the sub-raster panel.

16. The display device according to claim 13, wherein each pixel in the sub-display panel comprises a plurality of sub panel pixels which are arranged in sequence in a first direction, each pixel in the sub-raster panel comprises a plurality of sub raster pixels which are arranged in sequence in a second direction, the pixels in the sub-display panel and the pixels in the sub-raster panel are identical in size, and the first direction is perpendicular to the second direction.

* * * * *